United States Patent
Glass et al.

(10) Patent No.: US 11,482,366 B2
(45) Date of Patent: Oct. 25, 2022

(54) CHOKE FOR ELECTRICALLY-DRIVEN CHARGING DEVICES

(71) Applicant: BorgWarner Inc., Auburn Hills, MI (US)

(72) Inventors: Thomas Glass, Rockenhausen (DE); Johannes Hornbach, Frankenthal (DE); Ramona Grundmeier, Argenschwang (DE)

(73) Assignee: BORGWARNER, INC., Auburn Hills, MI (US)

( * ) Notice: Subject to any disclaimer, the term of this patent is extended or adjusted under 35 U.S.C. 154(b) by 483 days.

(21) Appl. No.: 16/625,868

(22) PCT Filed: Jun. 26, 2018

(86) PCT No.: PCT/US2018/039401
§ 371 (c)(1),
(2) Date: Dec. 23, 2019

(87) PCT Pub. No.: WO2019/005730
PCT Pub. Date: Jan. 3, 2019

(65) Prior Publication Data
US 2020/0135377 A1 Apr. 30, 2020

(30) Foreign Application Priority Data
Jun. 26, 2017 (DE) .......................... 102017210735.9

(51) Int. Cl.
*H02K 11/33* (2016.01)
*H02K 11/02* (2016.01)
*H01F 17/06* (2006.01)

(52) U.S. Cl.
CPC ............. *H01F 17/06* (2013.01); *H02K 11/02* (2013.01); *H02K 11/33* (2016.01)

(58) Field of Classification Search
CPC .......... H02K 11/02; H02K 11/33; H01F 17/06
(Continued)

(56) References Cited

U.S. PATENT DOCUMENTS 7,182,585 B2  2/2007  Bauknecht et al.
2004/0047752 A1  3/2004  Bauknecht et al.
(Continued)

FOREIGN PATENT DOCUMENTS

CN  203761344 U  *  8/2014  .......... H03H 1/0007
CN  203761344 U     8/2014
(Continued)

OTHER PUBLICATIONS

International Search Report of the International Searching Authority for PCT/US2018/039401 dated Oct. 23, 2018.
(Continued)

*Primary Examiner* — Jorge L Carrasquillo
(74) *Attorney, Agent, or Firm* — Reising Ethington P.C.

(57) ABSTRACT

One aspect of the present disclosure relates to a power electronics device for an electrically-driven charging device for an engine, said power electronics device comprising one or more power electronics components which are designed to operate an electrically-driven charging device for an engine, first and second conductors for guiding current for the one or more power electronics components, and a choke for filtering electromagnetic interference. The choke has a magnetic core which forms a closed ring about the first and second conductors and comprises a tongue which extends, arising from the closed ring, between the first and second conductors.

14 Claims, 5 Drawing Sheets

(58) Field of Classification Search
USPC .................................... 318/400.24; 361/763
See application file for complete search history.

(56) References Cited

U.S. PATENT DOCUMENTS

| | | | |
|---|---|---|---|
| 2007/0052500 A1* | 3/2007 | Korich | H01R 13/719 |
| | | | 333/202 |
| 2016/0218599 A1* | 7/2016 | Hanft | H02K 11/33 |
| 2017/0093357 A1* | 3/2017 | Okada | H02M 1/44 |
| 2017/0194090 A1* | 7/2017 | Tanimizu | H01F 27/327 |

FOREIGN PATENT DOCUMENTS

| | | | | |
|---|---|---|---|---|
| DE | 20 2013 104903 U1 | 11/2013 | | |
| DE | 10 2015 205815 A1 | 10/2016 | | |
| EP | 1 343 954 A1 | 9/2003 | | |
| EP | 1343954 B1 * | 4/2004 | ............. | F02B 33/40 |
| EP | 1343954 B1 | 4/2004 | | |
| FR | 3 044 989 A1 | 6/2017 | | |
| FR | 3044989 A1 * | 6/2017 | ............. | H01F 17/06 |
| WO | WO-2016009134 A1 * | 1/2016 | ............. | F02B 39/10 |

OTHER PUBLICATIONS

Chinese Office Action for Chinese Application No. 201880042377.X dated Oct. 11, 2021 (7 pages).
English Translation of Chinese Application No. 201880042377.X dated Oct. 11, 2021 (10 pages).

* cited by examiner

CHOKE FOR ELECTRICALLY-DRIVEN CHARGING DEVICES

TECHNICAL FIELD

The present invention relates to power electronics devices for electrically-driven charging devices, electrically-driven charging devices, and a method for producing power electronics devices for electrically-driven charging devices.

BACKGROUND INFORMATION

Electrically-driven charging devices are increasingly used these days as a supplement to or replacement of turbochargers in engines. For example, by combining an electrically-powered charging device with a turbocharger, it is possible to improve the response time for the entire charging device.

Electrically-driven charging devices require electronic components, that are partly charged with high electrical power transfer, and which correspondingly function using high currents. For example, an electric motor, which operates a compressor wheel of an electrically-driven charging device, may have a power consumption in the range of several kilowatts (at least at times). In addition, it may be necessary as part of the operation of the electrically-driven charging device to switch high currents with relatively high frequencies.

Due to these and other reasons, the power electronics device of the electrically-driven charging device may be the source of substantial electromagnetic interference. This may propagate or be emitted via the conductors of the onboard electronics of a vehicle, and may negatively affect the function of other components. On the other side, electromagnetic interference, which is generated by other electronic components of the onboard electronics, may negatively affect the components of the electrically-powered charging device. For this reason, it is desirable to suppress electromagnetic interference, which has its origin in the power electronics components of the electrically-powered charging device, or may affect the same.

BRIEF DESCRIPTION OF THE INVENTION

A first general aspect of the present invention relates to a power electronics device for an electrically-driven charging device for an engine, said power electronics device comprising one or more power electronics components which are designed to operate an electrically-driven charging device for an engine, first and second conductors for guiding current for the one or more power electronics components, and a choke for filtering electromagnetic interference. The choke has a magnetic core which forms a closed ring about the first and second conductors and comprises a tongue which extends, arising from the closed ring, between the first and second conductors.

A second general aspect of the present invention relates to a charging device for an engine, said charging device comprising a compressor unit with at least one compressor wheel, an electric motor which is arranged to electrically drive the at least one compressor wheel, and a power electronics component according to the first general aspect of the present invention.

A third general aspect of the present invention relates to a method for producing a power electronics device for an electrically-driven charging device for an engine, which comprises: providing one or more power electronics components which are designed to control an electrically-driven charging device for an engine; providing first and second conductors for guiding current for the one or more power electronics components; placing a magnetic core over the first and second conductors, wherein the magnetic core forms a closed ring about the first and second conductors and comprises a tongue, which extends, arising from the closed ring, between the first and second conductors; and joining the one or more power electronics components, the first and second conductors, and the magnetic core in order to form the power electronics device.

The devices and the method of the first through third general aspects of the invention may achieve one or more of the following advantages in specific embodiments.

First, the propagation of both common-mode interference (interference which propagates equally on the first and the second conductor) and also of differential-mode interference (interference with propagates in opposite directions on the first and the second conductor) may be reduced or even eliminated. The closed ring of the magnetic core may provide a relatively high impedance for common-mode interference. In particular, as there are no gaps present in the circumferential direction, the closed ring presents a continuous path in the magnetic material for the magnetic flow. Thus, an increased impedance may be achieved for common-mode interference, in comparison to open rings, which have one or more gaps (even if they are small). Alternatively, a comparative impedance may be achieved at smaller dimensions for the choke.

Furthermore, one part of the closed ring and the tongue between the conductors form (with a defined air gap) circuits in each case for the magnetic flow around each of the two conductors to suppress differential-mode interference.

In many systems of the prior art, two different components are provided for the purpose of handling common-mode and differential-mode interference. For example, a common-mode interference suppression may be achieved by the provision of a toroidal core choke, on which the two conductors are wound. To suppress the differential-mode interference, additional components may be provided (for example, rod cores with windings). These components are schematically illustrated in FIG. 3B and FIG. 3C. Both interference suppressing functions may be integrated in one component using the devices and the method of the first through third general aspects of the invention. This may result in a reduced requirement for installation space and/or a less expensive design of the interference suppressing components.

Secondly, the devices and the method of the first through third general aspects may offer advantages during the assembly of the interference suppressing components with respect to many examples of the prior art. Thus, in many examples, the magnetic core may be placed over the first and second conductor (or vice versa). This may reduce production costs for producing the interference suppressing components. In addition, the properties of the choke may be more controllable and reproducible than for many examples of the prior art. In particular, winding the conductors around a magnetic core may be avoided. This winding is necessary, for example, for toroidal core chokes or rod core chokes, and is often difficult to automate, and therefore is a relatively expensive and/or poorly reproducible process. As a result of the poor reproducibility, the properties of the components with windings may scatter in many examples, which may be disadvantageous for the use of these components. The chokes of the present disclosure may mitigate or solve these problems in many examples.

Thirdly, the choke may be designed such that the tongue arranged between the conductors is saturated first in certain operating states (e.g., if a specified direct current flows through the first and second conductor) while the closed ring is not yet saturated. Thus, a high impedance of the closed ring, and consequently a good filtering affect with respect to common-mode interference may be maintained (while the filtering affect for differential-mode interference decreases). This may be advantageous because in many situations, common-mode interference plays a more important role than differential-mode interference in electrically-driven charging devices.

Fourthly, the magnetic flow may be substantially guided in the material of the magnetic core of the chokes. Thus, the stray fields of the choke may be reduced with respect to many interference suppressing components of the prior art. Thus, for example, to suppress differential-mode interference in rod core chokes, the magnetic flow is guided for the most part into the air, which may cause scattering effects in adjacent components.

Additional explanations regarding the above-mentioned advantages, and additional advantages that may be achieved with many embodiments of the devices and the method, are contained in the detailed description.

Some terms are used in the following way in the present disclosure.

The suffix [sic: prefix] 'Leistung-' [power] in relation to electrical values and electronic components designates situations in which an electrical power consumption is at least temporarily over 500 W. Thus, for example, a power consumption of a power electronics device for an electrically-driven charging device for an engine may sometimes be over 1 kW (for example, over 5 kW).

The term 'ring' in the present disclosure designates a structure that surrounds an interior exactly once. A ring may be circular; however, it may also have any other shape. For example, a ring according to the present disclosure may be ellipsoidal, triangular, rectangular, or be N-sided polygon (where N is greater than four) or have an irregular shape. In other examples, a ring may be composed from a plurality of straight or curved segments.

If not otherwise indicated in the specific case, the terms 'approximately' or 'substantially' may designate a deviation of 10% from an indicated value in the present disclosure. If two values are compared, the term 'approximately equal' may include deviations of up to 10% from the smaller value. The same applies to the term 'substantially'.

DETAILED DESCRIPTION OF THE INVENTION

The following detailed description of the invention is structured as follows. Initially, aspects of the power electronics device according to the present disclosure will be generally introduced by way of FIG. 1. FIG. 2 and FIG. 4A show exemplary chokes according to the present disclosure. Different aspects of the chokes will be discussed by way of these and associated FIGS. 3A-C and 4B. Finally, different aspects of the integration of the power electronics device according to the present disclosure into a charging device or into an engine are discussed by way of FIG. 1 again and by way of FIG. 5.

Overview

Figure 1:
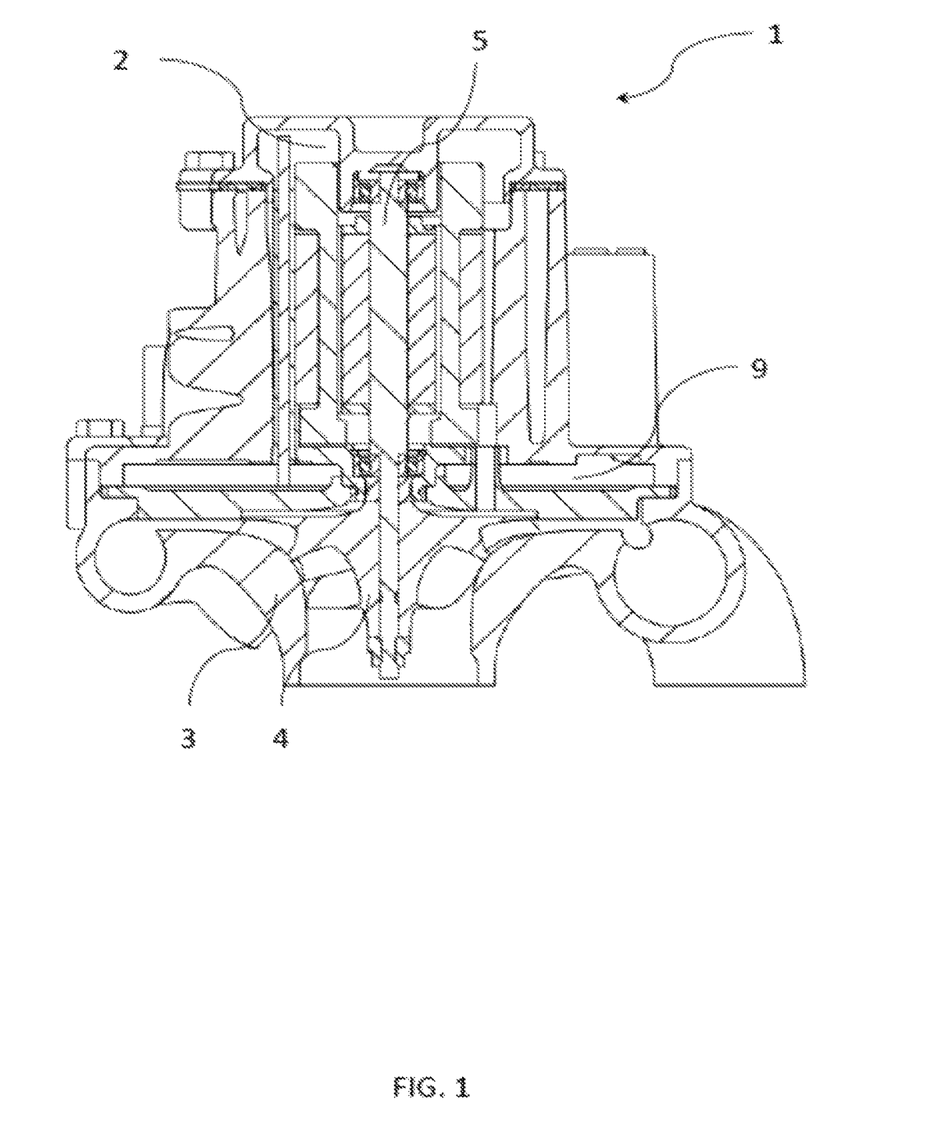
FIG. 1 is a side view through an exemplary electrically-powered charging device, which contains a power electronics device according to the present disclosure.
Figure 2:
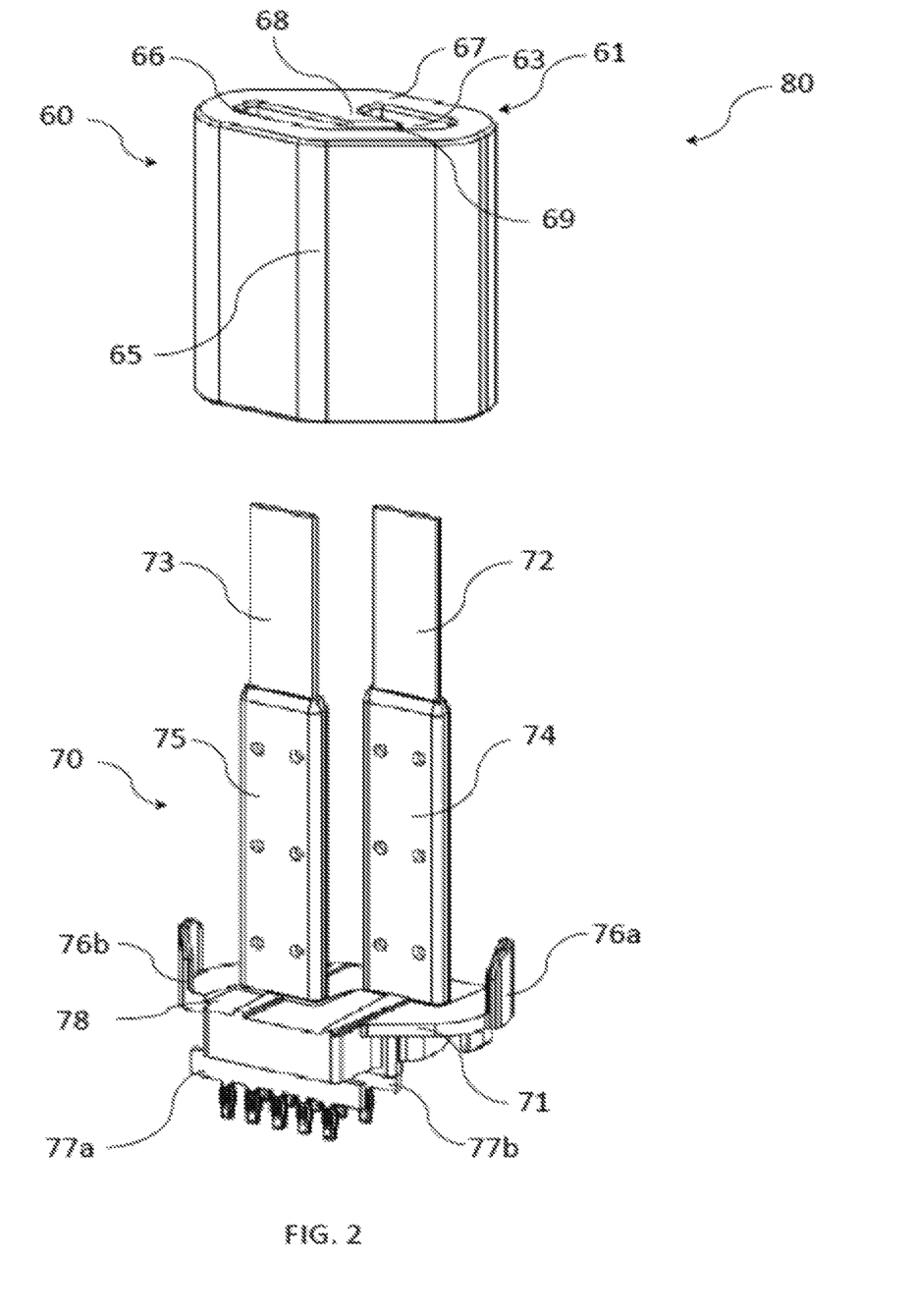
FIG. 2 shows an exemplary choke with a magnetic core and a carrier for the magnetic core according to the present disclosure.

FIG. 1 shows an exemplary electrically-driven charging unit 1. The details of this exemplary charging unit will be discussed later in the context of this detailed description. A power electronics device 9 is integrated into the assembly of the electrically-driven charging unit. This includes a plurality of power electronics components (not shown in FIG. 1). Among these are included one or more chokes (also designated as 'interference suppressing throttles' or chokes) to suppress different types of electromagnetic interference. Each choke surrounds two conductors of power electronics device 9 (not shown in FIG. 1), said conductors may, for example, be part of a direct current supply of the power electronics components of power electronics device 9. Additional details about power electronics device 9 and its possible integration in an electrically-driven charging unit 1 are discussed in the penultimate part of the detailed description. Initially, however, aspects of the chokes of the present disclosure are explained in greater detail by way of FIGS. 2 through 4B.

Exemplary Chokes

FIG. 2 shows an exemplary choke 80 with a magnetic core 60 and a carrier 70 for magnetic core 60 according to the present disclosure. The features discussed by way of FIG. 2 are not, however, limited to the example shown, but instead may also be used in other examples of the present disclosure. In particular, magnetic core 60 may also be used with other types of carriers than the carrier shown in FIG. 2 (and vice versa). The magnetic cores of the present disclosure may also by used in power electronics devices without specialized carriers.

Magnetic core 60 forms a closed ring 67 about the first and second conductors 72, 73 (in the installed state) and comprises a tongue 68 which extends, arising from closed ring 67, between first and second conductors 72, 73. Closed ring 67 has no gap in a circumferential direction about first and second conductors 72, 73. The magnetic flow lines of first and second conductors 72, 73 also lie in the circumferential direction when a (direct) current flows through these. Therefore, closed ring 67 may guide the magnetic flow, which is generated by the current flow through first and second conductors 72, 73, completely into a material of magnetic core 60. As a result of this, an impedance produced by the magnetic core may be relatively high with respect to common-mode interference along first and second conductors 72, 73. Details about the mechanism of the interference suppression by the magnetic cores of the present disclosure are discussed in the following in conjunction with FIG. 3A.

In the example from FIG. 2, the magnetic core defines two parallel slots 63, 66, which each extend from a first end face 61 of magnetic core 60 to a second end face, opposite to first end face 61 (not visible in FIG. 2).

In the present disclosure (not only in conjunction with FIG. 2), those sides of the magnetic core are considered to be end faces, through which the first and second conductors enter into the interior of the magnetic core and emerge from the same. In the case of FIG. 2, the first and second end faces lie, in the joined state, approximately perpendicular to a longitudinal direction of the first and second conductors. In other examples, however, these end faces may also be designed differently (for example, angled or curved).

The expression, 'longitudinal direction of the conductors', designates a primary direction of the current flow in the first and second conductors (because the two conductors (may) guide current in two different directions during operation, the longitudinal direction may selectively point in two antiparallel directions). In the example from FIG. 2, a current through first and second conductors 72, 73 during operation would flow in the plane of the paper. Correspondingly, the longitudinal direction lies in the plane of the paper (and points, according to definition, upwards or downwards).

As the magnetic core is designed to surround the first and second conductors in a predetermined way (i.e., the arrangement of the conductors is determined by the geometry of the magnetic core or vice versa), the magnetic core also extends along the longitudinal direction. This extension is also designated in the present invention as the 'height' of the magnetic core.

The planes perpendicular to the longitudinal extension of the conductors or the primary direction of the current flow in the first and second conductors are also designated as cross-sectional planes or as a cross section of the magnetic core. As the magnetic field generated by the current flowing through the conductors, and thus likewise the magnetic flow, surrounds the conductors perpendicular to the primary direction of the magnetic flow, the lines of the magnetic flow also lie in these cross-sectional planes. The two cross-sectional planes or the cross sections, which terminate the magnetic core in the longitudinal direction, are also designated as end faces. The outer surface, which surrounds the magnetic core between the two end faces, is also designated as the lateral surface (for example, lateral surface 65 in FIG. 2).

In many examples of the present disclosure, the magnetic core has a general shape of a cylinder. In other words, a shape, which is generated by displacing a bottom surface (for example first end face 61 in FIG. 2) by a certain amount in a straight line. The magnetic core in these examples has uniform cross sections along the longitudinal axis of the magnetic core (in other words, the cross-sectional surfaces are congruent). This may affect both the outer periphery of the magnetic core in cross section (thus, an outer perimeter of a shape which is formed by a section of the magnetic core with a cross-sectional plane), the inner periphery of the magnetic core in cross section (thus an inner perimeter of a shape which is formed by a section of the magnetic core with a cross-sectional plane), or both.

Thus, for example, magnetic core 60 in FIG. 2 has a substantially parallelogram-shaped yet not rectangular outer periphery in cross section, and the magnetic core from FIG. 4A has a substantially rectangular outer periphery in cross section. In other examples, however, the magnetic core may also have other shapes of the outer periphery in cross section (for example, that of an ellipsoid or a regular or irregular N-sided polygon, or an irregular shape).

It is, however, also conceivable that the magnetic core has different cross sections along the longitudinal axis (e.g. expanding or contracting). In many examples, the magnetic core extends in a direction which is perpendicular to the end faces of the magnetic core (this is thus a straight, general cylinder). It is, however, also possible, that the magnetic core extends at an oblique angle between the end faces of the magnetic core (this is thus an oblique, general cylinder in these examples).

In the example from FIG. 2, a gap 69 is formed between tongue 68 of magnetic core 60 and closed ring 67. Gap 69 extends through magnetic core 60 in the longitudinal direction (from the first end face to the second). In the assembled state of the choke, the gap may be filled with a material having a relative_permeability number less than 2 (or approximately 1). The material may, for example, be air or another gas, a plastic material or a ceramic.

As is likewise visible in FIG. 2, gap 69 may connect first and second slots 63, 66. Gap 69 and first and second slots 63, 66 thus interrupt the end face and form a contiguous shape. Because both gap 69 and also first and second slots 63, 66 may be continuous in the longitudinal direction of the magnetic core; they may form a contiguous cavity which extends between the end faces of the magnetic core.

In the example from FIG. 2, first and second slots 63, 66 are offset relative to one another (in a direction of the additional extension of the gap transverse to the longitudinal direction). In other words, first and second slots 63, 66 form two opposite sides of a parallelogram (which is not, however, a rectangle) in first end face 61 (and also in the other opposite end face) of magnetic core 60. In other examples, the first and second slots may form two parallel sides of a trapezoid, which is not, however, a rectangle or a parallelogram, in the first end face (and also in the other opposite end face) of the magnetic core. First slot 63 may be offset with respect to second slot 66 by more than half of the length (for example, more than 0.8 times the length) of first slot 63.

In many examples, first and second slots 63, 66 do not have axial symmetry in first end face 61 (and also in the other opposite end face) (i.e. they may not be formed by a perpendicular axial mirroring on an axis of symmetry with itself).

A mutually offset (or also a non-axially symmetric) arrangement of the first and second slots (and thus also the conductors) may have various advantages. On the one hand, the outer periphery of the magnetic core may be parallelogram-shaped in cross section (however not rectangular), or may have another form deviating from a substantially rectangular outer periphery. This may be helpful if the magnetic core must be integrated into narrow spaces in a power electronics device or in a charging device. Furthermore, this arrangement of the conductors may also have advantages with respect to the interference suppressing effects of the choke. For this purpose, other embodiments will be made in conjunction with FIG. 3A.

In other examples, the first and second slots may be arranged in alignment (e.g. in the example from FIG. 4A). In other words, the first and second slots from two opposite sides of a rectangle in the end face of the magnetic core.

Tongue 68 in FIG. 2 has a substantially parallelogram, however not rectangular shape, in a cross-sectional plane. The tongue may be formed differently in other examples. In the example from FIG. 2, the tongue extends across at least 65% of an inner distance of a first side of closed ring 67 of magnetic core 60 from a second side of ring 67 spaced apart from the first side and lying opposite to the same. In other examples, the tongue may extend across more than 80% of an inner distance of a first side of the closed ring of the magnetic core from a second side of the closed ring spaced apart from the first side and lying opposite to the same (such an example is the magnetic core from FIG. 4A).

All materials that are suitable for guiding the magnetic flow are possible as material for the magnetic cores of the present disclosure. In particular, the magnetic cores may contain one or more ferrimagnetic ceramic materials or consist of one or more ferrimagnetic ceramic materials. For example, the magnetic cores may contain a ferrite or consist of a ferrite.

In the preceding sections, aspects of the magnetic cores according to the present disclosure were discussed. In the following, the embodiment of carrier 70 for the magnetic core shall be discussed in greater detail.

Carrier 70 may comprise a base body 71 which may hold the elements of carrier 70 together. Base body 71 may be designed as one piece (as shown in FIG. 2) or as multiple parts. In one example, base body 71 contains an electrically non-conductive material (e.g., a material with an electrical conductivity below $10^{-6}$ S·cm-1 at room temperature and direct voltage), or consists of an electrically non-conductive material. In many examples, the base body contains a plastic material or consists of a plastic material. In other examples, the base body contains a ceramic material or consists of a ceramic material.

Carrier 70 may have one or more of the following elements.

In many examples, first and second conductors 72, 73 are connected to carrier 70 (e.g. integrated into carrier 70). In the example from FIG. 2, first and second conductors 72, 73 are each configured with an elongated rectangular cross section. The conductors may, however, also have other configurations (for example, a square, round, or oval cross section). The properties of the chokes discussed using the example of an elongated rectangular cross section may also be transferred to a system comprising such conductors.

It is also not mandatory that the first and second conductors are each one piece (as is clear in FIG. 2). Instead, the first and second conductors may also each comprise multiple conductor strands in other examples.

As is clear in FIG. 2, first and second conductors 72, 73 may extend in a straight line and be arranged parallel. Both may be advantageous; however, they are not necessarily mandatory (thus, it is also conceivable, that the first and second conductors have a curve and the magnetic cores are correspondingly adapted to surround curved conductors).

In addition or alternatively, carrier 70 may have contacts 77a, 77b for contacting the first and second conductors. In the example from FIG. 2, contacts 77a, 77b are designed to be inserted through one or more through passages of a printed circuit board. This may be advantageous, as it may simplify a population using choke 80. In other examples, however, contacts 77a, 77b may have another configuration (for example, be configured as contact terminals).

Other contacts for contacting the first and second conductor may be formed by parts of first and second conductors 72, 73 projecting out of the magnetic core. In the example from FIG. 2, a length of first and second conductors 72, 73 is greater than the height of magnetic core 60. Thus, when magnetic core 60 is placed over first and second conductors 72, 73, first and second conductors 72, 73 project out of first end face 61 of magnetic core 60. The projecting parts may form contacts for contacting first and second conductors 72, 73.

Conductors 72, 73 and associated contacts 77a, 77b may be designed as a one-part element (for example, as parts cut or stamped from sheet metal). These one-piece elements may be integrated into base body 71. In this case, first and second conductors 72, 73 may be handled together with base body 71 (for example, populated on a printed circuit board).

In addition or alternatively, the carrier (in particular base body 71 of the carrier) may comprise positioning elements 76a, 76b for magnetic core 60. These may be designed so that magnetic core 60, which is inserted into carrier 70, is held (at least partially) in a predetermined position by positioning elements 76a, 76b.

In the example from FIG. 2, positioning elements 76a, 76b are configured like two fingers, which form contact surfaces adapted to an outer periphery of magnetic core 60. In addition, carrier 70 forms a plate 78 on which the magnetic core may be set. However, other positioning elements are also conceivable. Thus, the magnetic core may be held lying (thus resting on its lateral surface 65) instead of standing (thus resting on one of its end faces). A corresponding carrier in this case has positioning elements adapted to the lateral surface and/or the end faces of the magnetic core.

In addition or alternatively, carrier 70 may comprise first and second sleeve elements 74, 75, which each surround one of first and second conductors 72, 73. Sleeve elements 74, 75 may extend in an area which is enclosed by magnetic core 60 when magnetic core 60 is connected to carrier 70.

In many examples, sleeve elements 74, 75 electrically insulate magnetic core 60 and first and second conductors 72, 73. In addition, sleeve elements 74, 75 may be designed to achieve a precise positioning of first and second conductors 72, 73 in magnetic core 60. This may be advantageous to guarantee reproducible properties of choke 80.

In many examples, sleeve elements 74, 75 are configured as one piece with base body 71. Base body 71 may also electrically insulate magnetic core 60 from other elements of the choke and/or of the power electronics device. Thus, in the example from FIG. 2, magnetic core 60 stands on plate 78, which may electrically insulate magnetic core 60 from other elements (for example, conductor paths on a printed circuit board on which the choke may be populated).

Mode of Action of the Chokes

After possible structural features of the magnetic core and an optional carrier have been discussed in the preceding sections, the following sections are dedicated to the mode of action of the choke of the present disclosure. This will be explained in greater detail by way of FIGS. 3A through 3C.

The choke of the present disclosure is designed to suppress the propagation of common-mode and differential-mode interference through the first and second conductors.

Initially, chokes from the prior art will be discussed in greater detail in conjunction with FIG. 3B and FIG. 3C for purposes of illustration.

FIG. 3B shows a toroidal core choke for suppressing the propagation of common-mode interference. Two conductors 92, 93 are thereby wound on a magnetic core 90a in such a way that currents flowing in opposite directions in the two conductors induce magnetic flows in opposite directions in magnetic core 90a. As a result of this, the flows add signals that propagate in the same direction on the two conductors (thus common-mode signals). This leads to a relatively large impedance for common-mode signals being present along conductors 92, 93, by which means the propagation of common-mode interference may be prevented. In contrast, differential-mode signals (and also differential-mode interference) may pass the toroidal core choke undisturbed.

To suppress the propagation of differential-mode interference, rod magnetic cores with windings may be used. Such a solution is shown in FIG. 3C. Rod magnetic cores 90b, 90c with windings for each of two conductors 92, 93 form an impedance for differential-mode interference along conductors 92, 93. A (high frequency) change of the current with differential-mode proportions leads to a magnetic flow through rod cores 90b, 90c and outside of the rod cores, which ensures an increased impedance along the conductors.

The magnetic cores of the present disclosure may provide both of the described interference suppressing functions in one element. This will now be explained in conjunction with FIG. 3A.

Figure 3A:
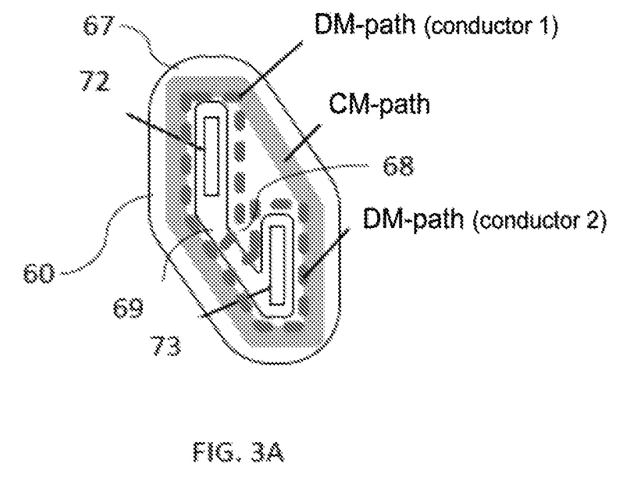
FIG. 3A shows exemplarily the magnetic flow for common-mode and differential-mode interference in the choke from FIG. 2.
Figure 3B:
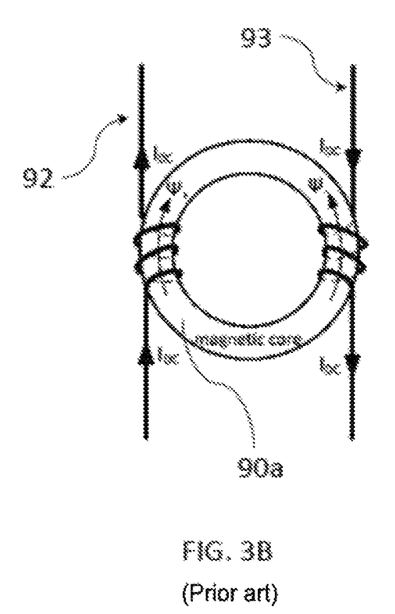
FIG. 3B and FIG. 3C show interference suppressing chokes for suppressing common mode interference (FIG. 3B) and differential-mode interference (FIG. 3C) from the prior art.
Figure 3C:
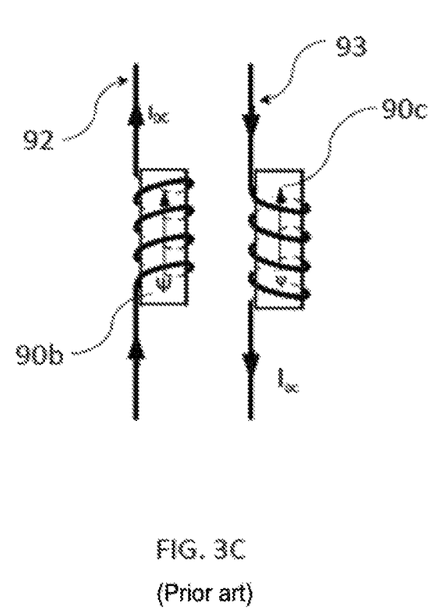
Figure 4A:
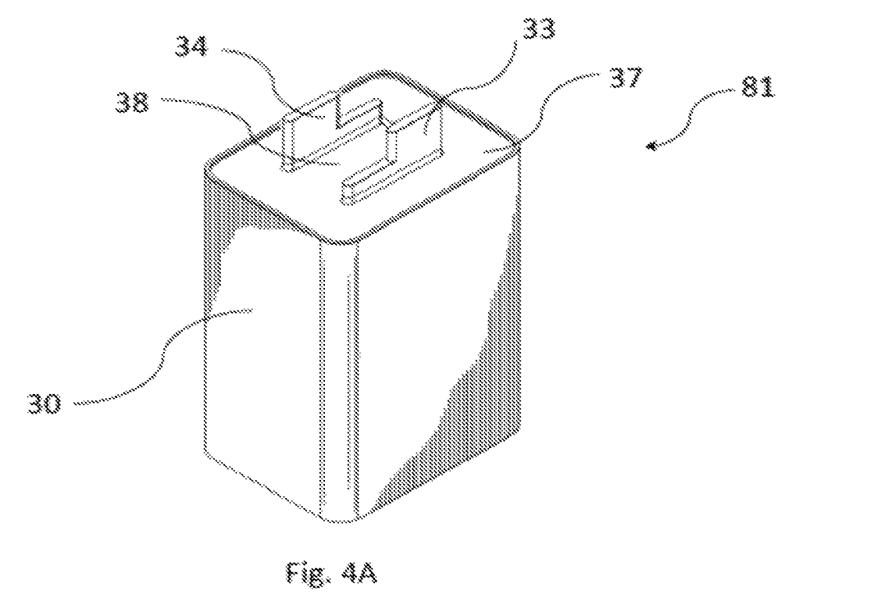
FIG. 4A shows a second exemplary choke with a magnetic core according to the present disclosure.

FIG. 3A shows a cutaway through the magnetic core from FIG. 2 perpendicular to the flow direction of the current through the conductors enclosed by the magnetic core (thus in a cross-sectional plane of the magnetic core). In this cutaway, FIG. 3A illustrates the path for the magnetic flow which is generated by the common-mode interference and by the differential-mode interference. The paths are thereby only schematically depicted in FIG. 3A. The physically correct paths may extend (slightly) differently.

On the one hand, magnetic core 60 provides a first path (CM-path—'CM' stands for common-mode) for magnetic flow along closed ring 67 completely within magnetic core 60. The first path (CM-path) surrounds both first and also second conductors 72, 73 in one loop.

Due to the magnetic flow along the first path (CM-path), an impedance for common-mode interference is generated along first and second conductors 72, 73. As a result, a propagation of common-mode interference may be suppressed. The first path (CM-path) thereby has the shape of an elongated hexagon (with rounded corners in comparison with the qualitative course shown in FIG. 3A). However, in other examples, the first path (CM-path) may also have other shapes. For example, the first path may be ellipsoidal (in particular circular) or rectangular. In other examples, the first path (CM-path) may have an irregular shape (which may comprise, for example, a plurality of straight and/or curved sections).

Because magnetic core 60 and also first and second conductors 72, 73 extend in the direction perpendicular to the plane of the paper, the first path (CM-path) shown in FIG. 3A is extended across the entire height of magnetic core 60. The impedance of the choke for common-mode interference thus increases with an increase in height of magnetic core 60.

In addition to the first path (CM-path), magnetic core 60 also forms two additional paths for the magnetic flow around respectively only one of the two conductors 72, 73 (DM-path conductor 1 and DM-path conductor 2—'DM' stands for differential mode). The additional path for the magnetic flow around the first conductor (DM-path conductor 1) comprises a first part of closed ring 67 and also tongue 68. Admittedly, the additional path around the first conductor (DM-path conductor 1) also leads across gap 69. This is thus—unlike the first path (CM-path)—not a path that extends completely in the material of magnetic core 60. The magnetic flow along the additional path around the first conductor (DM-path conductor 1) ensures an impedance for differential-mode interference that propagates along first conductor 72.

The same applies for the magnetic flow around the second conductor (DM-path conductor 2). This path comprises a second part of the closed ring (different from the first part in the additional path for the first conductor), tongue 68, and gap 69. The magnetic flow along the additional path around the second conductor (DM-path conductor 2) ensures an impedance for differential-mode interference that propagates along second conductor 73.

By this means, the chokes of the present disclosure unite the functions of both chokes from FIG. 3B and FIG. 3C. In this way, a less expensive and space saving arrangement of the chokes may be achieved. In addition, both paths for suppressing differential-mode interference (DM-path conductor 1 and DM path conductor 2) extend primarily in magnetic core 60. Thus, interference caused by stray fields may be prevented, in contrast to many solutions from the prior art (see, for example, FIG. 3C).

Even if the function of the common-mode and differential-mode suppression by the chokes of the 'parallelogram-shaped' magnetic core 60 from FIG. 3A have been discussed, the basic properties may also be transferred to all other magnetic cores of the present disclosure. Thus, the provision of common-mode and differential-mode interference suppression is not basically a function of the shape of the first path and the additional paths.

Admittedly, the arrangement of the conductors and the paths from FIG. 3A may be advantageous in certain situations. Thus, for example, the path in FIG. 3B may be shorter in comparison to a substantially rectangular common-mode path with the same spacing and length of the slots for the conductors, which may cause an increased impedance for the suppression of common-mode interference (with respect to a specific installation space).

The combination of a choke for suppressing the propagation of common-mode and differential-mode interference in one choke (in one magnetic core) may facilitate other advantageous modifications in many cases.

Thus, the chokes may be designed such that, beginning at a certain direct current level, which flows through the conductors, a common-mode interference filtering effect remains maintained while a differential-mode interference filtering effect subsides.

For this purpose, the magnetic core may be dimensioned so that (at least one part of) the tongue is saturated at a certain direct current level, while the material of the magnetic core on the closed circuit is not yet saturated. As a result of this, the magnetically active (effective) air gap increases, which may prevent further saturation. Because the areas of the tongue are not influenced for the common-mode interference, a suppression of the propagation of common-mode interference may remain (substantially) unaffected. This mechanism may be advantageous in particular for automotive applications in the engine compartment, as the saturation limit of many ferrites, from which the magnetic cores may be manufactured, is reduced at increasing temperatures. Due to a corresponding design, it may be achieved that the often more important filtering effect for common-mode interference remains maintained in spite of this.

As already mentioned, a height of the magnetic core may influence the impedance of the chokes according to the present disclosure. Thus, a design of the choke may include the determination of the height of the magnetic core. The design of the magnetic core may additionally include a selection of the length, the width of the tongue and the air gap.

Method for Constructing a Choke

In the following sections, the assembly of the chokes of the present disclosure will be discussed by way of FIG. 2.

FIG. 2 shows an exemplary magnetic core 60 and an exemplary carrier 70 in a disassembled state. As is clear from FIG. 2, the assembly of both parts may be carried by placing magnetic core 60 over first and second conductors 72, 73. In other examples, first and second conductors 72, 73 (separately or as a unit) may be inserted into magnetic core 60. Thus, magnetic core 60 forms a closed ring 67 about the first and second conductors and tongue 68 which extends between first and second conductors 72, 73. In other words, first and second slots 63, 66 of magnetic core 60 respectively accommodate one of first and second conductors 72, 73.

As is clear from this example, the configuration of the magnetic core according to the present disclosure may facilitate a very simple assembly of the choke. The placement process may, for example, be automated. In addition, a positioning of the conductors in the magnetic core may be more precise than in many other chokes of the prior art. Thus, for example, toroidal core chokes or rod chokes must often be wound by hand, which may be time intensive and in addition leads in many cases to varying properties based on the variation in the windings.

Even if the method for assembling the magnetic core was explained in greater detail by way of FIG. 2, this method is also possible with other forms of the chokes of the present disclosure. Thus, for example, a carrier for the magnetic core does not have to be present. The magnetic core without a carrier may also be placed over the first and second conductors (or vice versa). Thus, the first and second conductors may only be provided with an insulating sleeve in one example.

The particular configuration of the chokes of the present disclosure additionally facilitates numerous other modifications.

In one example, a carrier for the magnetic core may be provided with the first and second conductors and elements for mounting the carrier on a printed circuit board. The magnetic core may then be placed on the carrier and the ensemble may be populated on and contacted to the printed circuit board.

In other examples, a carrier for the magnetic core may form its own assembly with the first and second conductors. This assembly may have a fastening element for fastening in a desired position in a power electronics device for an electrically-driven charging device.

In another example, the assembly of a choke may comprise the selection of a magnetic core with a certain height. Thus, a carrier for the magnetic core may be designed so that magnetic cores with different heights may be placed thereon.

In one example, a first magnetic core with a first height may be replaced by a second magnetic core with a second, greater height. In this way, an impedance of the choke may be set relatively easily and reproducibly. As stated above, the impedance provided by the magnetic core increases with an increasing height of the magnetic core. It is thus possible to adapt the properties of the choke to a specific application situation. The impedance may even be changed relatively easily after the assembly or installation of the choke, if an originally selected impedance should prove to be unfavorable.

It is additionally possible that the choke comprises multiple magnetic cores (for example two magnetic cores) according to the preceding examples, wherein each magnetic core is designed to form a closed ring about the first and second conductors and comprises a tongue, arising from the closed ring, which extends between the first and second conductors (for example, the choke may have two, three, or more than three magnetic cores configured in this way).

The multiple magnetic cores may thereby have the same geometry or may have different geometries. In addition or alternatively, the magnetic cores may comprise the same or different materials (the term 'different material' includes different material types and also different embodiments of the same material type). In one example, a first magnetic core of the choke includes a first ferrite material, and a second magnetic core of the choke includes a second ferrite material differing from the first material.

Due to the provision of a plurality of identical magnetic cores, the impedance of the choke may be increased (as one magnetic core with a greater length is effectively used). The use of different magnetic cores (for example, magnetic cores made form different materials) may improve the interference suppressing properties of the choke. Thus, for example, one such choke may be better suited for suppressing broadband interference (thus interference which contains a large number of different frequencies). This task may be more difficult to fulfill with one single magnetic core (or may require a higher magnetic core), as the material properties and thus the impedance of the magnetic core is frequency-dependent.

In one example, a first magnetic core made from a first material may have a maximum impedance at a first, lower frequency. A second magnetic core made from a second material, differing from the first material, may have a maximum impedance at a second, higher frequency. A choke, which may contain the first and second magnetic cores, may thus provide a higher impedance for a broader bandwidth.

The multiple magnetic cores may be arranged in different ways in the choke. In one example, the multiple magnetic cores may be arranged one behind the other about the first and second conductors. Thus, for example, a single carrier (as shown in FIG. 2), may be populated with two or more stacked magnetic cores. In this example, the multiple magnetic cores are arranged directly behind one another (for example, stacked). However, it is also possible to arrange the multiple magnetic cores separately about the first and second conductors (for example, on two or more carriers).

Additional Variants of the Choke

In the preceding sections, numerous aspects and variants of the chokes according to the present disclosure were explained in greater detail by way of the example from FIG. 2. FIG. 4A shows another variant of the chokes according to the present disclosure. In the example from FIG. 4A, the magnetic core 30 of the choke has a form of a cuboid. As already discussed, the form of the magnetic core may be varied in different ways.

Thus, in other examples, the magnetic core may have the shape of a parallelepiped. In addition, the edges of the magnetic core may be provided with roundings. Thus, the magnetic core of the example from FIG. 2 may also be viewed as a parallelepiped with rounded corners. Basically, the (outer) shape of the magnetic core may be selected independently from the arrangement of the conductors in the magnetic core. However, as the weight and the amount of material used should be reduced in different examples, the outer shape of the magnetic core depends on the shape and arrangement of the conductors in these situations.

In the example from FIG. 4A, first and second conductors 33, 34 are arranged parallel to and aligned with one another. The same applies for the slots through magnetic core 30, which accommodate the first and second conductors. In other words, conductors 33, 34 or the slots in the cross-sectional planes through the magnetic core form opposite sides of a rectangle.

In the example from FIG. 4A, first and second conductors 33, 34 are equipped with L-shaped contact terminals. By this means, the contacting of first and second conductors 33, 34 may be simplified.

Figure 4B:
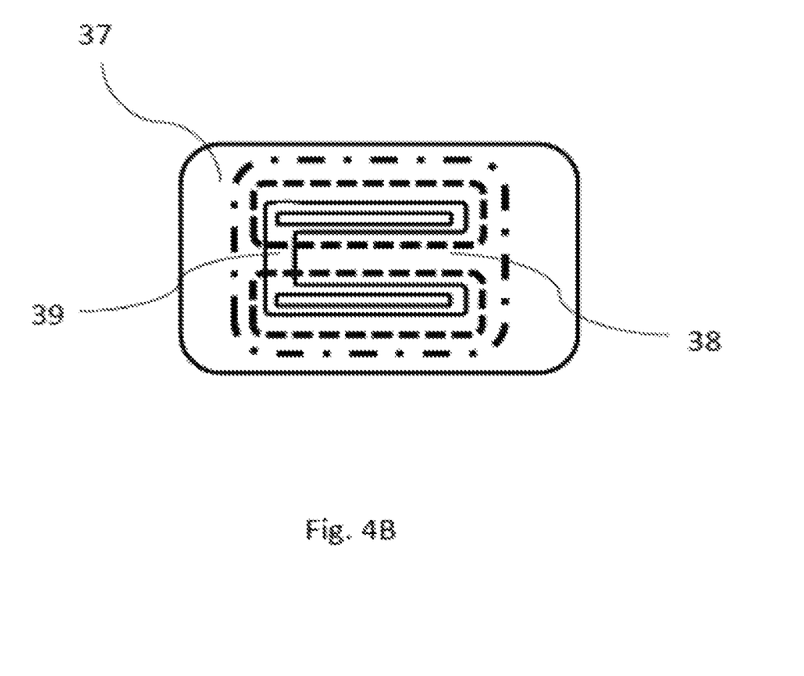
FIG. 4B illustrates the magnetic flow for common-mode and differential-mode interference in the choke from FIG. 4A.

As is shown in FIG. 4B, the magnetic core of FIG. 4A also forms a closed ring 37 about both conductors 33, 34. This ring forms a path for the magnetic flow (dot-dashed line) which is generated by common-mode interference. In addition, magnetic core 30 also forms additional paths (dashed lines) around first or second conductor 33, 34 respectively. As in the preceding examples, a magnetic flow forms along these paths which is generated by differential-mode interference.

In the preceding examples, the magnetic core forms a tongue 38, which extends from one side of the closed ring to an opposite side (between the first and second conductor).

However, in other examples, the magnetic core may also have two tongues, which extend from different sides of the closed ring to the respectively opposite side (between the first and second conductor). In this example, a gap may extend between the ends of the two tongues. In many examples, the two tongues may have the same length. In other examples, the two tongues may have different lengths.

Integration and Arrangement of the Chokes

The chokes of the present disclosure may be part of a power electronics device. This power electronics device may be integrated into an electrically-powered charging device. The electrically-powered charging device may in turn be part of an engine. Basically, the chokes according to the present disclosure may be used in any power electronics devices and in any electrically-powered charging devices.

In spite of this, some aspects of these components are briefly discussed in the following sections.

As previously mentioned, FIG. 1 shows an exemplary, electrically-driven charging unit 1. Electrically-driven charging unit 1 includes an electric motor 5 in a drive unit 2. Electric motor 5 may contain, for example, a synchronous motor with permanent magnet excitation.

In addition, electrically-driven charging unit 1 comprises a compressor unit 3 with a compressor wheel 4. A power electronics device 9 is integrated between drive unit 2 and compressor unit 3. In other examples, power electronics device 9 is integrated into electrically-driven charging unit 1 in a different way. In these examples, power electronics device 9 may be mutually cooled via a cooling of electrically-driven charging unit 1. In one example, electrically-driven charging unit 1 is applied on a cooled surface of electrically-driven charging unit 1. It is also possible that power electronics device 9 is integrated into other components.

In each case, the chokes of the present disclosure may facilitate a favorable integration into the installation space provided due to their compact designs. In particular, the shape factor of the choke may be adapted as needed (for example, by an outer periphery that is not cuboidal).

In the example from FIG. 1, power electronics device 9 includes a printed circuit board on which the power electronics components are arranged. However, this configuration of the power electronics device is not mandatory. In the present disclosure, the term power electronics device includes every combination of components which function to control an electric motor of an electrically-driven charging device. The components of the power electronics device may be present in one single or multiple different assemblies. For example, the components of the power electronics device may be arranged on one single or on multiple printed circuit boards. In other examples, individual components of the power electronics device (for example, the chokes) may be structurally separate and/or applied separately.

However, in each case, the power electronics device comprises a choke for suppressing electromagnetic interference. Possible configurations of this choke were described in the preceding sections.

Furthermore, the power electronics device comprises first and second conductors (not shown in FIG. 1), which are surrounded by the magnetic core of the choke. In many examples, the first and second conductors are supply lines (or parts of the supply lines) of power electronics device 9. These supply lines may supply the power electronics device with the required electrical power to operate the power electronics components (and ultimately the electric motor).

The choke may be arranged at any point within power electronics device 9. In one example, the choke is at a connection point of a supply line of power electronics device 9. In other words, the components of power electronics device 9 (or at least a plurality of these components) lie "behind" the choke when viewed from the supply line. In other examples, however, the choke may be arranged between two components of power electronics device 9.

In one example, the first and second conductors are designed to carry a current with an amperage of more than 20 amps (or also more than 50 amps or more than 100 amps). In many examples, the current guided in the first and second conductors is direct current. In these or other examples, an electrical output guided via the first and second conductors may be more than 1 kW (for example, more than 2 kW or more than 5 kW). The chokes according to the present disclosure may be designed to allow direct current to pass (substantially) unhindered in the first and second conductors. The propagation of signals with frequencies that are higher than a predetermined limit frequency (for example, frequencies above a limit frequency of 0.1 MHz) may, in contrast, be suppressed as described above.

The components of the power electronics device may comprise any components that are required for controlling an electrically-powered charging device. For example, the power electronics device may comprise a converter for supplying the electric motor with electric alternating current. In the converter, a direct current, with which power electronics device 9 is supplied, may be converted into a suitable alternating current for operating electric motor 5. In this process, relatively high currents with high frequencies may be switched. Therefore, the converter of power electronics device 9 may become a source of substantial interference.

With the aid of the chokes of the present disclosure, the propagation (for example via the first and second conductors or also through radiation) of this interference into other components connected to power electronics device 9 may be prevented. However, other components besides the converter of power electronics device 9 may also be the source of interference whose propagation should be suppressed by means of the chokes.

To filter the interference under discussion, power electronics device 9 may comprise additional means which suppress the propagation of electromagnetic interference. In one example, power electronics device 9 comprises one or more interference suppressing capacitors.

The interference suppressing capacitors may be arranged on only one side of the choke. The term 'side' is not to be understood here strictly spatially, but rather functionally with respect to the circuit of the choke in power electronics device 9. Thus, the choke may be viewed in the electrical equivalent circuit diagram as a four port, wherein each of the corresponding ends of the first and second conductors forms one 'side' of the four port.

In most of the examples, the choke has a first side, which faces a supply line of power electronics device 9 (for example, a supply line from a power supply unit of the power electronics device 9). Correspondingly, the choke may have a second side which faces other components of power electronics device 9.

In one example, one or more interference suppressing capacitors are arranged on the first side of the choke. In this example, the propagation of interference, which propagates via the supply line in the direction of power electronics device 9, may thus be suppressed.

In another example, one or more interference suppressing capacitors are arranged on the second side of the choke. In this example, the propagation of interference, which propagates from the components of power electronics device 9 in the direction of the supply line, may thus be suppressed.

In other examples, one or more interference suppressing capacitor may be arranged on both sides of the choke.

Thus, the supply line of power electronics device 9 may be connected to first and second conductors 72, 73 at the contact terminals projecting out of the magnetic core in the example from FIG. 2. The top side of the choke is thus the first side. Similarly, contacts 77a, 77b may be connected to additional components of power electronics device 9. The bottom side of the choke thus forms the second side of the choke.

In several examples, the one or more interference suppressing capacitors contain one or more Y-capacitors. These may guide interference, whose propagation is to be suppressed by the choke, to ground or to a neutral wire, or short circuit the same.

In the last sections, aspects of the installation of the choke into power electronics device 9 and into electrically-driven charging unit 1 were discussed. In the following, the arrangement of an electrically-powered charging device, which comprises power electronics device 9 of the present disclosure including chokes, in a motor vehicle will be discussed by way of FIG. 5.

Figure 5:
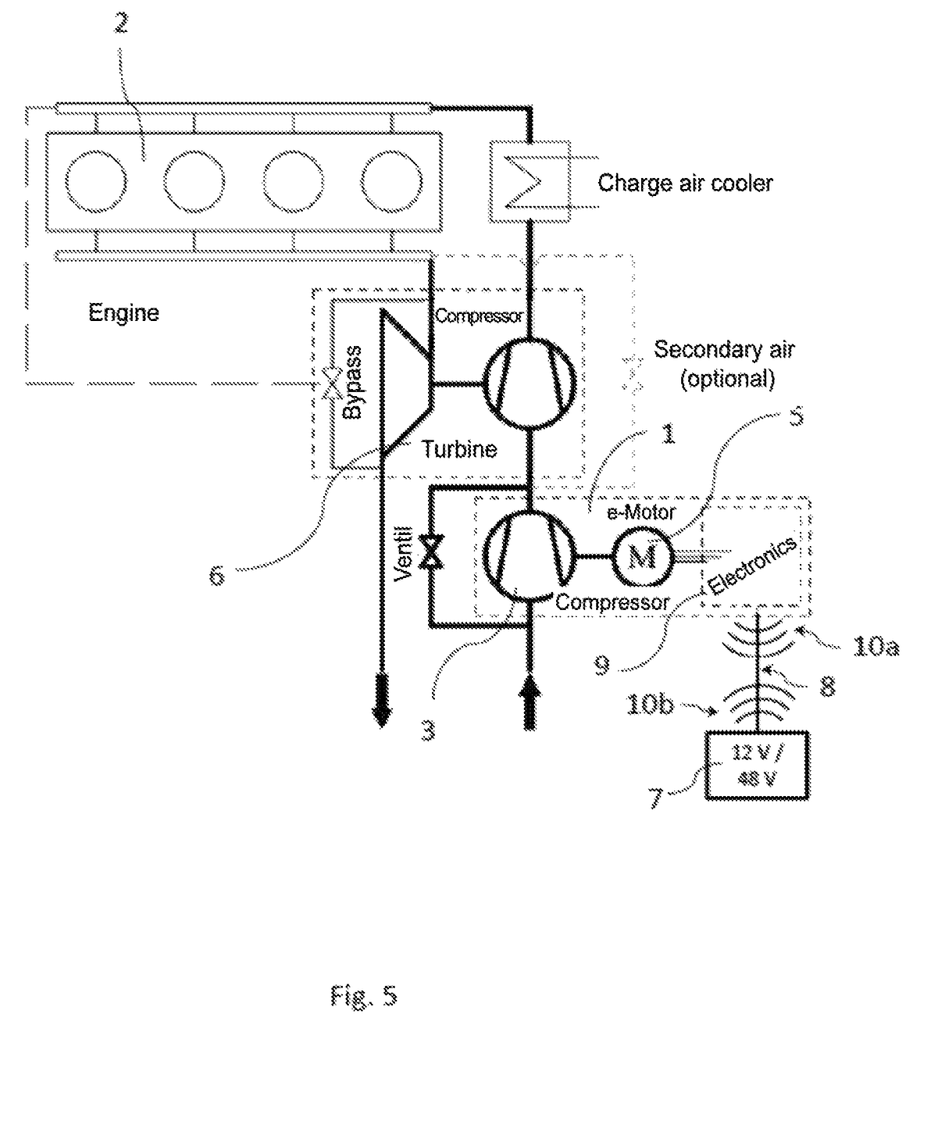
FIG. 5 schematically shows the arrangement of an electrically-powered charging device in a motor vehicle.

FIG. 5 schematically shows the arrangement of an electrically-powered charging device 1 in a motor vehicle. As stated above, electrically-powered charging device 1 comprises a compressor unit 3, an electric motor 5, and a power electronics device 9 with at least one choke (not shown in FIG. 5).

Power electronics device 9 is connected via a supply line 8 to a power supply 7 of the motor vehicle. Power supply 7 may be part of a 12 volt or 48 volt onboard network. In one example, the first and second conductors, which are surrounded by the choke, are part of supply line 8.

As is shown in FIG. 5, interference 10a, 10b may propagate both from power electronics device 9 in the direction of supply line 8 (interference 10a) and also in the reverse direction (interference 10b). The propagation may thereby be carried out via the conductors themselves or by radiation. The chokes of the present disclosure may be arranged (if necessary with additional components) to suppress the propagation of interference in one direction (thus interference 10a or 10b) or in both directions.

Electrically-driven charging unit 1 in FIG. 5 is arranged with another charging unit 6 in series. The serially-arranged, electrically-driven, and additional charging units 1, 6 charge an engine 2 (an internal combustion engine in the example from FIG. 5). In another arrangement, electrically-driven charging unit 1 may be integrated on a shaft of an additional charging unit.

However, the chokes discussed in the present disclosure and power electronics device are not limited to certain arrangements of charging units, drive unit or engine types, or vehicle types. Instead, the chokes and power electronics devices may be used in different arrangements of charging units, drive unit or engine types, or vehicle types.

For example an engine charged using electrically-driven charging unit 1 may be a gasoline or diesel engine, or a hybrid engine. In other examples, an engine charged using electrically-driven charging unit 1 may include a fuel cell.

In many examples, power electronics device 9 may be used in motor vehicles with the chokes of the present disclosure in electrically-driven charging units 1 (for example, in passenger vehicles or commercial vehicles). However, power electronics devices 9, with the chokes of the present disclosure, may also [verb] in electrically-driven charging units 1 of any other vehicle (for example, water craft or aircraft).

Additional Embodiments

Additional examples for the power electronics device for an electrically-driven charging device, electrically-driven charging devices, and methods for producing a power electronics device for an electrically-driven charging device for an engine according to the present disclosure are found in the following embodiments.

1. A power electronics device for an electrically-driven charging device for an engine, comprising:
one or more power electronics components which are designed to operate an electrically-driven charging device for an engine;
first and second conductors for guiding current for one or more power electronics components; and
a choke for filtering electromagnetic interference,
wherein the choke has a magnetic core which forms a closed ring about the first and second conductors and comprises a tongue which extends, arising from the closed ring, between the first and second conductors.

2. The power electronics device according to Embodiment 1, wherein the tongue extends across at least 65% of an inner distance of a first side of the closed ring of the magnetic core from a second side of the ring spaced apart from the first side and lying opposite to the same.

3. The power electronics device according to Embodiment 1 or 2, wherein the tongue is separated from the closed ring by a gap.

4. The power electronics device according to Embodiment 3, wherein the gap is filed with a material having a permeability number less than 2.

5. The power electronics device according to one of the preceding Embodiments 1 through 4, wherein the magnetic core is defined by a first and a second elongated slot, wherein the first slot accommodates the first conductor, and the second slot accommodates the second conductor.

6. The power electronics device according to Embodiment 5, wherein the first and second slots are arranged aligned in the magnetic core.

7. The power electronics device according to Embodiment 5, wherein the first and second slots are arranged in the magnetic core offset with respect to one another.

8. The power electronics device according to Embodiment 3 and one of Embodiments 5 through 7, wherein the gap and the first and second elongated slots are connected to one another.

9. The power electronics device according to one of the preceding embodiments 1 through 8, wherein the closed ring defines a substantially rectangular or ellipsoidal path for the magnetic flow around the first and second conductors.

10. The power electronics device according to one of the preceding embodiments 1 through 8, wherein the closed ring defines a substantially parallelogram-shaped but not rectangular path for the magnetic flow around the first and second conductors.

11. The power electronics device according to one of the preceding embodiments 1 through 8, wherein the closed ring defines a substantially parallelogram-shaped but not rectangular cross section in a plane of the magnetic flow lines of the first and second conductors.

12. The power electronics device according to one of the preceding embodiments 1 through 11, wherein the magnetic core has a first and a second end face and extends in a longitudinal direction from the first to the second end face.

13. The power electronics device according to Embodiment 12, wherein the first and second conductors extend inside of the magnetic core between the first and second end faces.

14. The power electronics device according to one of the preceding embodiments 1 through 13, wherein the first and second conductors extend substantially parallel.

15. The power electronics device according to one of the preceding embodiments 1 through 14, wherein the first and second conductors extend substantially in a straight line.

16. The power electronics device according to one of the preceding embodiments 1 through 15, wherein the conductors have a rectangular, in particular, elongated cross section.

17. The power electronics device according to one of the preceding embodiments 1 through 16, wherein the magnetic core has a uniform cross section in a plane perpendicular to a direction of a current flow through the conductors.

18. The power electronics device according to one of the preceding embodiments 1 through 17, wherein the tongue has a rectangular cross section in a plane perpendicular to a direction of a current flow through the conductors.

19. The power electronics device according to one of the preceding embodiments 1 through 17, wherein the tongue has a substantially parallelogram-shaped but not rectangular cross section in a plane perpendicular to a direction of a current flow through the conductors.

20. The power electronics device according to one of the preceding embodiments 1 through 19, wherein the choke is designed to suppress the propagation of common-mode and differential-mode interference through the first and second conductors.

21. The power electronics device according to Embodiment 20, wherein the choke is designed to suppress the propagation of common-mode interference by providing a path along the closed ring through which an impedance for common-mode interference is generated along the first and second conductors.

22. The power electronics device according to Embodiment 20 or Embodiment 21, wherein the choke is designed to suppress the propagation of differential-mode interference by providing a first path for the magnetic flow around the first conductor, comprising a first part of the closed ring and the tongue, and by providing a second path for the magnetic flow around the second conductor, comprising a second part of the closed ring and the tongue.

23. The power electronics device according to one of the preceding embodiments 1 through 22, wherein the choke is designed such that, beginning at a certain direct current level, which flows through the conductors, a common-mode interference filtering effect remains maintained while a differential-mode interference filtering effect subsides.

24. The power electronics device according to one of the preceding embodiments 1 through 23, wherein the magnetic core is configured as one piece.

25. The power electronics device according to one of the preceding embodiments 1 through 24, wherein the closed ring does not comprise a gap in a circumferential direction around the first and second conductors.

26. The power electronics device according to one of the preceding embodiments 1 through 25, wherein the magnetic core is manufactured from a ferrite material.

27. The power electronics device according to one of the preceding embodiments 1 through 26, wherein the magnetic core is placed over the first and second conductors or vice versa.

28. The power electronics device according to one of the preceding embodiments 1 through 27, additionally comprising:
a carrier on which the magnetic core is placed,
wherein the first and second conductors are connected to the carrier, and
wherein the carrier comprises connection elements for contacting the first and second conductors.

29. The power electronics device according to one of the preceding embodiments 1 through 28, wherein the choke comprises a second magnetic core which is configured as is described in one of Embodiments 1 through 28.

30. The power electronics device according to Embodiment 29, wherein the two magnetic cores are arranged one behind the other around the first and second conductors.

31. The power electronics device according to Embodiment 29 or Embodiment 30, wherein the two magnetic cores are manufactured from different materials.

32. The power electronics device according to Embodiment 30 or Embodiment 31, wherein the choke comprises one or more additional magnetic cores, which are configured as described in one of Embodiments 1 through 29.

33. The power electronics device according to one of the preceding embodiments 1 through 32, wherein the first and second conductors are designed for guiding a current, in particular a direct current, with an amperage of more than 20 amps.

34. A charging device for an engine, comprising:
a compressor unit with at least one compressor wheel;
an electric motor which is arranged to electrically drive the at least one compressor wheel; and
a power electronics device according to one of Embodiments 1 through 33.

35. The charging device according to Embodiment 34, wherein the compressor unit is a compressor assembly.

36. The charging device according to one of Embodiments 34 or 35, wherein the power electronics device and the compressor unit are integrated into one component.

37. The charging device according to Embodiment 36, wherein the power electronics device is integrated between the compressor unit and the electric motor.

38. An engine which comprises a charging device according to one of Embodiments 34 through 37.

39. The engine according to Embodiment 38, wherein the engine is a gasoline or diesel engine, or a hybrid engine.

40. The engine according to Embodiment 38, wherein the engine includes a fuel cell.

41. A method for producing a power electronics device for an electrically-driven charging device for an engine, comprising:
providing one or more power electronics components which are designed to operate an electrically-driven charging device for an engine;
providing first and second conductors for guiding current for the one or more power electronics components;
assembling a magnetic core and the first and second conductors together, wherein the magnetic core forms a closed ring about the first and second conductors and comprises a tongue which extends, arising from the closed ring, between the first and second conductors; and
joining the one or more power electronics components, the first and second conductors, and the magnetic core to form the power electronics device.

42. The method according to Embodiment 41, wherein the magnetic core is joined to the first and second conductors as a module in the power electronics device.

The invention claimed is:

1. A power electronics device (9) for an electrically-driven charging device for an engine, comprising:
one or more power electronics components which are designed to operate an electrically-driven charging device (1) for an engine;
first and second conductors (72, 73) for guiding current for the one or more power electronics components; and
a choke (81; 80) for filtering electromagnetic interference, wherein the choke (81; 80) has a magnetic core (30; 60) which forms a closed ring (37; 67) about the first and second conductors (33, 34; 72, 73) and comprises a tongue (38; 68) which extends, arising from the closed ring (37; 67), between the first and second conductors (33, 34; 72, 73) and across at least 65% of an inner distance of a first side of the closed ring (37; 67) of the magnetic core (30; 60) from a second side of the closed ring (37; 67) spaced apart from the first side and lying opposite to the same.

2. The power electronics device according to claim 1, wherein the tongue (38; 68) is separated from the closed ring (37; 67) by a gap (39; 69).

3. The power electronics device according to claim 1, wherein the magnetic core (30; 60) is defined by a first and a second elongated slot (63, 66), wherein the first slot (63) accommodates the first conductor (72), and the second slot (66) accommodates the second conductor (73).

4. The power electronics device according to claim 3, wherein the first and second slots (63, 66) are arranged in the magnetic core (60) offset with respect to one another.

5. The power electronics device according to claim 1, wherein the closed ring (67) defines a substantially parallelogram-shaped but not rectangular cross section in a plane of the magnetic flow lines of the first and second conductors (72, 73).

6. The power electronics device according to claim 1, wherein the tongue (68) has a substantially parallelogram-shaped but not rectangular cross section in a plane perpendicular to a direction of a current flow through the conductors (72, 73).

7. The power electronics device according to claim 1, wherein the choke (81; 80) is designed to suppress the propagation of common-mode and differential-mode interference through the first and second conductors (33, 34; 72, 73).

8. The power electronics device according to claim 1, wherein the choke (81; 80) is designed such that, beginning at a certain direct current level, which flows through the conductors (33, 34; 72, 73), a common-mode interference filtering effect remains maintained while a differential-mode interference filtering effect subsides.

9. The power electronics device according to claim 1, wherein the magnetic core (30; 60) is configured as one piece.

10. The power electronics device according to claim 1, wherein the magnetic core (30; 60) is placed over the first and second conductors (33, 34; 72, 73) or vice versa.

11. The power electronics device according to claim 1, additionally comprising:
a carrier (70) on which the magnetic core (60) is placed, wherein the first and second conductors (72, 73) are connected to the carrier (70),
wherein the carrier (70) comprises connection elements (77a, 77b) for contacting the first and second conductors (72, 73).

12. The power electronics device according to claim 1, wherein the choke comprises a second magnetic core, which is configured as described in claim 1, wherein the two magnetic core are optionally arranged one behind the other.

13. The power electronics device according to claim 12, wherein the two magnetic cores are manufactured from different materials.

14. A method for producing a power electronics device (9) for an electrically-driven charging device for an engine, comprising:
providing one or more power electronics components which are designed to operate an electrically-driven charging device (1) for an engine;
providing first and second conductors (33, 34; 72, 73) for guiding current for the one or more power electronics components;
assembling a magnetic core (30; 60) and the first and second conductors (33, 34; 72, 73) together, wherein the magnetic core (30; 60) forms a closed ring (37; 67) about the first and second conductors (72, 73) and comprises a tongue (38; 68) which extends, arising from the closed ring (37; 67), between the first and second conductors (33, 34; 72, 73) across at least 65% of an inner distance of a first side of the closed ring (37; 67) of the magnetic core (30; 60) from a second side of the closed ring (37; 67) spaced apart from the first side and lying opposite to the same; and
joining the one or more power electronics components, the first and second conductors (33, 34; 72, 73), and the magnetic core (30; 60) to form the power electronics device (9).

* * * * *